No. 742,886. PATENTED NOV. 3, 1903.
H. P. MAXIM.
CHARGING SYSTEM FOR SECONDARY BATTERIES.
APPLICATION FILED MAR. 12, 1903.
NO MODEL.
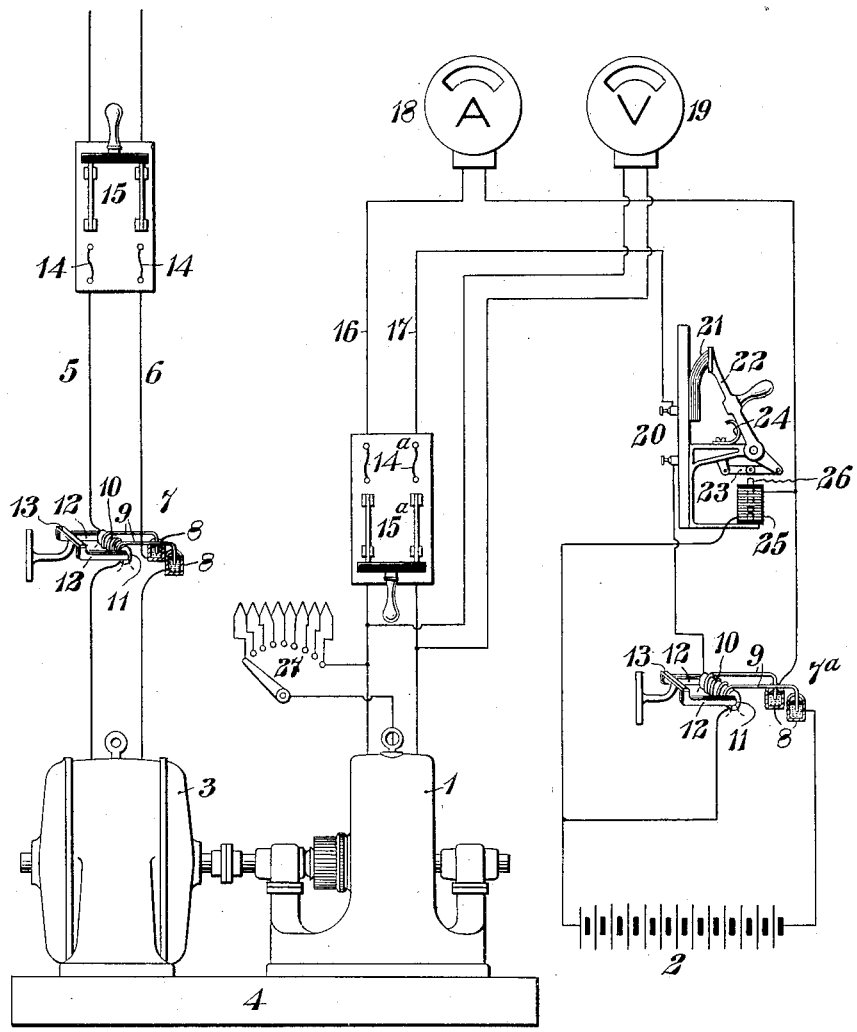
WITNESSES:
C. L. Belcher
J. C. Morse
INVENTOR
Hiram Percy Maxim
BY
Wiley I. Carr
ATTORNEY.

No. 742,886. Patented November 3, 1903.

UNITED STATES PATENT OFFICE.

HIRAM PERCY MAXIM, OF PITTSBURG, PENNSYLVANIA, ASSIGNOR TO WESTINGHOUSE ELECTRIC & MANUFACTURING COMPANY, A CORPORATION OF PENNSYLVANIA.

CHARGING SYSTEM FOR SECONDARY BATTERIES.

SPECIFICATION forming part of Letters Patent No. 742,886, dated November 3, 1903.

Application filed March 12, 1903. Serial No. 147,537. (No model.)

*To all whom it may concern:*

Be it known that I, HIRAM PERCY MAXIM, a citizen of the United States, and a resident of Pittsburg, in the county of Allegheny and State of Pennsylvania, have invented a new and useful Improvement in Charging Systems for Secondary Batteries, of which the following is a specification.

My invention relates to secondary-battery charging systems, and has more especial reference to the charging of batteries employed for supplying energy to automobile-motors; but it is not restricted to such specific use.

The object of my invention is to provide a system which shall insure the proper charging of a secondary battery from a source of energy that is unsuitable for direct supply to the battery, either because it is alternating in character or of inappropriate voltage or because both of these conditions exist.

In order to effect the desired result, I propose to employ a motor-generator set—that is, a motor adapted to the voltage and character of current of the supply-circuit and a generator adapted to supply the proper current and voltage for the battery to be directly coupled together. In the use of such a charging set it is possible that the current may fail in the motor-line, and thus cause the generator to be run from the battery as a motor, and thereby discharge the battery. The motor-generator set may continue to run after the battery has been fully charged, or a sudden overload may occur on either the generator or the motor, which in the absence of suitable protecting devices may result in damage to the apparatus. In order to provide against disarrangement or injury from any or all of these causes, I provide the means illustrated in the accompanying drawing, in which the single figure is a diagram of a complete charging set constructed and arranged to meet the conditions of practical service.

In this system a generator 1 of suitable voltage and current for charging a secondary battery 2 is coupled directly to a motor 3, here indicated as an alternating-current induction motor, the two machines being mounted upon a single base 4 and the motor being connected to a supply-circuit 5 6. In this supply-circuit is located an underload circuit-breaker 7, which may be of any suitable construction, but is here indicated as comprising two mercury-containing cups 8, which are respectively joined to the ends of an interrupted line conductor 6, two conducting-arms 9, having their free ends bent so as to dip into the mercury in the cups 8 and joined together at their other ends in the form of a coil 10, and a rotatable magnetizable core 11, having projecting magnetic pole-pieces 12, which engage with a stationary bridging-piece 13 to close a break in the conductor 5 when the current in the circuit 5 6 is sufficient to maintain the movable members of the breaker in the position indicated in the drawing. The magnetizable portions of this circuit-breaker are preferably laminated in accordance with the usual practice where alternating currents are employed.

When the current fails or falls off so much as to be insufficient for driving the motor 3, the breaker will automatically open the circuit.

For the purpose of protecting the motor against excessive currents in the circuit 5 6 any suitable overload circuit-interrupting device may be employed, that here shown being fuses 14, connected in series with the contact members of an ordinary manually-operated switch 15.

The circuit 16 17, leading from the generator 1 to the battery 2, is provided with an ammeter 18 and a voltmeter 19, connected and operating in the usual manner, and also with a switch $15^a$, provided with fuses $14^a$, similar to the corresponding parts employed in the circuit 5 6. I also provide an underload circuit-breaker $7^a$, which may be of the same character as the one already described in connection with the circuit 5 6, and I have here shown it as of the same construction and as provided with the same reference-numerals for its several parts. Consequently the description already given may be read in connection with this illustration. It is also desirable to cut the battery out of circuit when the voltage at its terminals indicates that an injurious gasing stage is reached. In order to effect this result, I provide an overvoltage circuit-breaker 20, which may be of any suitable construction and is here shown as comprising a laminated stationary contact-terminal 21, a pivoted coöperating member 22, toggle-levers 23 for holding the contact portion of the member 22 in engagement with the contact-face of the terminal 21, a spring 24 for throwing the member 22 outward when released, and a solenoid-coil 25, connected across the circuit 16 17 and provided with a movable core 26, which is drawn upward to engage the toggle-levers 23 and move them from their locking position when the voltage of the circuit equals or exceeds the predetermined limit for which the instrument is adjusted.

The battery charging may be controlled by means of a rheostat 27, the variable resistance of which is connected in the field-magnet circuit of the generator 1.

It will be understood from the illustration and the foregoing description that if the current fails in the motor-circuit the underload-breaker 7 of that circuit will open. Power being thus cut off from the generator, the underload-breaker 7ª will open, and thereby prevent the battery from discharging.

When the battery becomes fully charged, the overvoltage-breaker 20 will open, thus throwing the load off the generator. Both of the underload circuit-breakers will thereupon open and the entire system will be thus shut down.

If by reason of a short circuit or any other cause a dangerously-large current flows anywhere in the system, the fuses 14 or 14ª, or one of them, will be blown, and consequently both underload circuit-breakers will open and shut down the plant and prevent the batteries from discharging.

As has already been suggested, the specific structure of each piece of apparatus and part of the system is immaterial, provided such apparatus is adapted to perform the intended function, and I therefore do not intend to limit the invention to any specific structural details.

I claim as my invention—

1. The combination with a motor-generator and a secondary battery to be charged thereby, of overload and underload interrupting means in the supply-circuit and overload, underload and overvoltage interrupting means in the circuit between the motor-generator and the battery.

2. In a charging apparatus for secondary batteries, the combination with a motor-generator, of means in the supply-circuit for interrupting it when the current becomes excessive and means for interrupting it when the current fails or decreases a predetermined amount, like means between the motor-generator and the battery and also a circuit-breaker that responds to a predetermined voltage in said circuit.

3. The combination with a motor-generator and a secondary battery connected to receive energy from the generator member, of overload and underload cut-out devices in the supply-circuit leading to the motor member and overload, underload and overvoltage cut-out devices in the circuit between the generator member and the battery.

In testimony whereof I have hereunto subscribed my name this 5th day of March, 1903.

HIRAM PERCY MAXIM.

Witnesses:
B. M. SAWYER,
JAMES B. YOUNG.